United States Patent
Brockmann et al.

(10) Patent No.: US 10,754,930 B2
(45) Date of Patent: *Aug. 25, 2020

(54) REMOTELY MANAGED TRUSTED EXECUTION ENVIRONMENT FOR DIGITAL RIGHTS MANAGEMENT IN A DISTRIBUTED NETWORK WITH THIN CLIENTS

(71) Applicant: ActiveVideo Networks, Inc., San Jose, CA (US)

(72) Inventors: Ronald Brockmann, Utrecht (NL); Gerrit Hiddink, Amersfoort (NL)

(73) Assignee: ACTIVEVIDEO NETWORKS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,073

(22) Filed: Apr. 22, 2019

(65) Prior Publication Data
US 2019/0243949 A1    Aug. 8, 2019

Related U.S. Application Data

(63) Continuation of application No. 15/199,503, filed on Jun. 30, 2016, now Pat. No. 10,270,591.

(Continued)

(51) Int. Cl.
*G06F 21/10* (2013.01)
*H04L 29/06* (2006.01)
(Continued)

(52) U.S. Cl.
CPC .............. *G06F 21/10* (2013.01); *G06F 21/57* (2013.01); *H04L 9/0822* (2013.01);
(Continued)

(58) Field of Classification Search
None
See application file for complete search history.

(56) References Cited

U.S. PATENT DOCUMENTS 7,392,378 B1    6/2008  Elliott
7,945,616 B2    5/2011  Zeng et al.
(Continued)

OTHER PUBLICATIONS

ActiveVideo Networks, Inc., International Search Report and Written Opinion, PCT/US2016/040547, dated Sep. 19, 2016, 6 pgs.

(Continued)

*Primary Examiner* — Farid Homayounmehr
*Assistant Examiner* — Olanrewaju J. Bucknor
(74) *Attorney, Agent, or Firm* — Morgan, Lewis & Bockius LLP

(57) ABSTRACT

A method is performed at a client device distinct from an application server. In the method, a first key is stored in a secure store of the client device. A wrapped second key is received from the application server. The first key is retrieved from the secure store and used to unwrap the second key. Encrypted media content and a media control command to control playback of the media content is received from the application server. The content is decrypted using the unwrapped second key, and decoded for playback. During playback of the media content, a play position of the decrypted media content is transmitted to the application server and the decrypted media content is transmitted to a display device that is coupled to the client device. The decrypted media content is displayed in accordance with the received media control command.

15 Claims, 10 Drawing Sheets

Related U.S. Application Data

(60) Provisional application No. 62/187,140, filed on Jun. 30, 2015.

(51) Int. Cl.
  *G06F 21/57* (2013.01)
  *H04L 9/08* (2006.01)
  *H04L 9/32* (2006.01)

(52) U.S. Cl.
  CPC .......... *H04L 9/0897* (2013.01); *H04L 9/3234* (2013.01); *H04L 9/3265* (2013.01); *H04L 63/06* (2013.01); *H04L 2209/603* (2013.01); *H04L 2463/062* (2013.01)

(56) References Cited

U.S. PATENT DOCUMENTS

| | | | |
|---|---|---|---|
| 8,732,854 B2* | 5/2014 | Cholas | H04L 63/062 726/29 |
| 8,972,726 B1 | 3/2015 | Poling | |
| 9,313,458 B2* | 4/2016 | Helms | H04N 7/167 |
| 9,418,209 B2* | 8/2016 | Mangalore | G06F 21/60 |
| 2003/0126608 A1 | 7/2003 | Safadi et al. | |
| 2006/0129792 A1 | 6/2006 | Bots et al. | |
| 2007/0043667 A1 | 2/2007 | Qawami et al. | |
| 2007/0192798 A1 | 8/2007 | Morgan | |
| 2008/0046373 A1 | 2/2008 | Kim | |
| 2008/0098212 A1 | 4/2008 | Helms et al. | |
| 2009/0172726 A1 | 7/2009 | Vantalon et al. | |
| 2009/0265789 A1* | 10/2009 | Risan | G06F 21/10 726/26 |
| 2009/0316709 A1 | 12/2009 | Polcha et al. | |
| 2010/0064307 A1 | 3/2010 | Malhotra et al. | |
| 2010/0131411 A1 | 5/2010 | Jogand-Coulomb et al. | |
| 2011/0202948 A1 | 8/2011 | Bildgen et al. | |
| 2011/0299680 A1 | 12/2011 | Vembu et al. | |
| 2012/0008786 A1 | 1/2012 | Cronk et al. | |
| 2012/0030706 A1 | 2/2012 | Hulse | |
| 2012/0050012 A1* | 3/2012 | Alsina | H04N 21/4126 340/10.1 |
| 2012/0221853 A1* | 8/2012 | Wingert | G06F 21/10 713/160 |
| 2012/0257671 A1* | 10/2012 | Brockmann | H04N 21/64753 375/240.02 |
| 2013/0276015 A1 | 10/2013 | Rothschild et al. | |
| 2013/0305051 A1* | 11/2013 | Fu | H04L 63/061 713/175 |
| 2014/0095890 A1 | 4/2014 | Mangalore et al. | |
| 2014/0123169 A1 | 5/2014 | Koukarine et al. | |
| 2014/0157298 A1 | 6/2014 | Murphy | |
| 2014/0215214 A1* | 7/2014 | Barnes | G06F 21/10 713/171 |
| 2015/0229471 A1* | 8/2015 | Nair | H04L 9/0822 713/171 |
| 2016/0329080 A1* | 11/2016 | Singh | G11B 27/11 |
| 2016/0364553 A1* | 12/2016 | Smith | H04L 63/0428 |
| 2017/0270077 A1 | 9/2017 | Morard et al. | |

OTHER PUBLICATIONS

ActiveVideo Networks, Inc., International Preliminary Report on Patentability, PCT/US2016/040547, dated Jan. 2, 2018, 5 pgs.

ActiveVideo Networks, Inc., International Search Report and Written Opinion, PCT/US2016/051283, dated Nov. 29, 2016, 10 pgs.

ActiveVideo Networks, Inc., International Preliminary Report on Patentability, PCT/US2016/051283, dated Mar. 13, 2018, 9 pgs.

ActiveVideo Networks, Inc., Extended European Search Report, EP16818840.7, dated Nov. 30, 2018, 5 pgs.

Brockmann, Office Action, U.S. Appl. No. 15/199,503, dated Feb. 7, 2018, 12 pgs.

Brockmann, Notice of Allowance, U.S. Appl. No. 15/199,503, dated Aug. 16, 2018, 11 pgs.

Brockmann, Notice of Allowance, U.S. Appl. No. 15/199,503, dated Dec. 12, 2018, 9 pgs.

Brockmann, Office Action, U.S. Appl. No. 15/261,791, dated Feb. 21, 2018, 26 pgs.

Brockmann, Final Office Action, U.S. Appl. No. 15/261,791, dated Oct. 16, 2018, 17 pgs.

Brockmann, Office Action, U.S. Appl. No. 15/261,791, dated May 1, 2019, 20 pgs.

Brockmann, Final Office Action, U.S. Appl. No. 15/261,791, dated Oct. 28, 2019, 23 pgs.

Brockmann, Office Action, U.S. Appl. No. 15/261,791, dated Feb. 28, 2020, 25 pgs.

* cited by examiner

REMOTELY MANAGED TRUSTED EXECUTION ENVIRONMENT FOR DIGITAL RIGHTS MANAGEMENT IN A DISTRIBUTED NETWORK WITH THIN CLIENTS

RELATED APPLICATIONS

This application is a continuation of U.S. application Ser. No. 15/199,503, filed Jun. 30, 2016, entitled "Remotely Managed Trusted Execution Environment for Digital-Rights Management in a Distributed Network with Thin Clients," which claims priority to U.S. Provisional Patent Application No. 62/187,140, filed Jun. 30, 2015. These applications are incorporated by reference herein in their entirety.

TECHNICAL FIELD

The present disclosure relates generally to content-delivery systems and, more particularly, to digital-rights management (DRM) license enforcement on distributed networks.

BACKGROUND

Content distribution services have been developed by cable content providers and distributors in an attempt to compete with an emerging market trend called "cord cutting," wherein consumers discontinue traditional pay television subscriptions for programming delivered via legacy satellite or cable systems, in favor of accessing TV content through over-the-air television and/or online subscription services, for example Hulu, Netflix, or YouTube. These content distribution services, promoted as "TV Everywhere," include authenticated streaming and video-on-demand services that allow traditional television providers such as cable television system operators (now known as Multichannel Video Programming Distributors or MVPD's) to compete directly with such alternative wireless or Internet providers with the goal of retaining better-paying subscribers.

Cable content providers have marketed the use of such "TV Everywhere" services to allow multiplatform access to their content on devices such as personal computers, smart phones, tablets, and other devices. However, the most profitable content product to distribute remains the first release, in high definition, of a Hollywood movie delivered to a consumer on a pay-per-view or pay-per-day basis as early as possible in the movie's digital release window. While highly profitable, such popular content is a prime target for piracy and theft. To mitigate those risks, content owners require highly-robust digital-rights management (DRM) safeguards to ensure that the specific device requesting the content is authorized to view the content before allowing any device to decode and play the de-encrypted digital file containing such content.

Digital-rights management software that is robust enough to be trusted by movie studios and other owners of high-value content is complex and computationally intensive. Such commercial DRM products may include, by way of example only, "PlayReady" from Microsoft Corporation or "WideVine" from Alphabet Inc.'s Google division. Personal computers (PCs) and tablets typically contain the processor speed to process these complex security measures. DRM applications have also been devised that will run on some smartphones environments. However, the typical MVPD-supplied legacy set-top box (STB) is generally incapable of running the specific DRM application environment that may be required by the content owner, because such an STB lacks adequate computational power. So, instead of the MVPD's encouraging their subscribers to purchase access to first release, high-definition entertainment products from them, those potential customers are inadvertently directed toward competitive offerings delivered over the Internet instead of the MVPD's content distribution system.

SUMMARY

A robust digital-rights management system is implemented that maintains the security of content entrusted to it using entertainment industry-accepted safeguards including completing the customer authentication process in a Trusted Execution Environment (TEE) located within the customer's set-top box. The TEE communicates with a secure server, remote to the set-top box, located at the MVPD's system headend or elsewhere on a network. The client processor that is located in the subscriber's set-top box may effectively be tasked only with accepting the authority to display a certain video stream about to be transmitted to it.

In some embodiments, a method is performed at a client device distinct from an application server. In the method, a first key is stored in a secure store of the client device. A wrapped second key is received from the application server. The first key is retrieved from the secure store and used to unwrap the second key. Encrypted media content is received from the application server, decrypted using the unwrapped second key, and decoded for playback.

In some embodiments, a client device includes one or more processors and memory storing one or more programs configured to be executed by the one or more processors. The one or more programs include instructions for performing the above method. In some embodiments, a non-transitory computer-readable storage medium stores one or more programs for execution by one or more processors of a client device. The one or more programs include instructions for performing the above method.

BRIEF DESCRIPTION OF THE DRAWINGS

For a better understanding of the various described embodiments, reference should be made to the Detailed Description below, in conjunction with the following drawings. Like reference numerals refer to corresponding parts throughout the figures and description.

DETAILED DESCRIPTION

Reference will now be made to certain embodiments, examples of which are illustrated in the accompanying drawings. In the following description, numerous specific details are set forth in order to provide an understanding of the various described embodiments. However, it will be apparent to those of ordinary skill in the art that the various described embodiments may be practiced without these specific details. In other instances, well-known systems, methods, procedures, components, circuits, and networks have not been described in detail to avoid unnecessarily obscuring aspects of specific embodiments.

It has proven difficult to get acceptance from potential content partners for a "DRM bridge" solution, in which a centralized server platform terminates DRM and integrates with the MVPD's existing conditional-access system to re-encrypt content. Accordingly, there is need for DRM solution that provides end-to-end encryption, from the content-delivery network (CDN) down into the client device that displays content. In some embodiments of this solution, a generic DRM is facilitated on the client device, utilizing a trusted execution environment (TEE), which ultimately decrypts the content, to meet the robustness rules for content protection imposed by the copyright holders.

The initial case to consider is to provide a first DRM for an application engine, as sourced from a commercial DRM technology provider, which will be called "Vendor A" in this discussion. In some embodiments, "Vendor A DRM" could be "PlayReady," a commercial digital-rights management software system from Microsoft Corporation for third-party integration into consumer electronic devices intended for media playback and/or recording.

There are three options to provide such client-terminated DRM functionality:

1. Fully implement the 'Vendor A' DRM on the client. The drawback is that the client would need to be "thick." In this usage, "thick" is a term used by those familiar with the relevant art to describe complex software that requires considerable memory space and CPU power while executing. In contrast, software that is simpler in scope and still executes efficiently on less robust and less costly hardware is called "thin." A further differentiation occurs when the separation between the functionality of client and server is significant. By way of example, in some embodiments, the top-level API of the example "Vendor A" environment has 40 specific functions that are particular to that example DRM environment.

Figure 8:
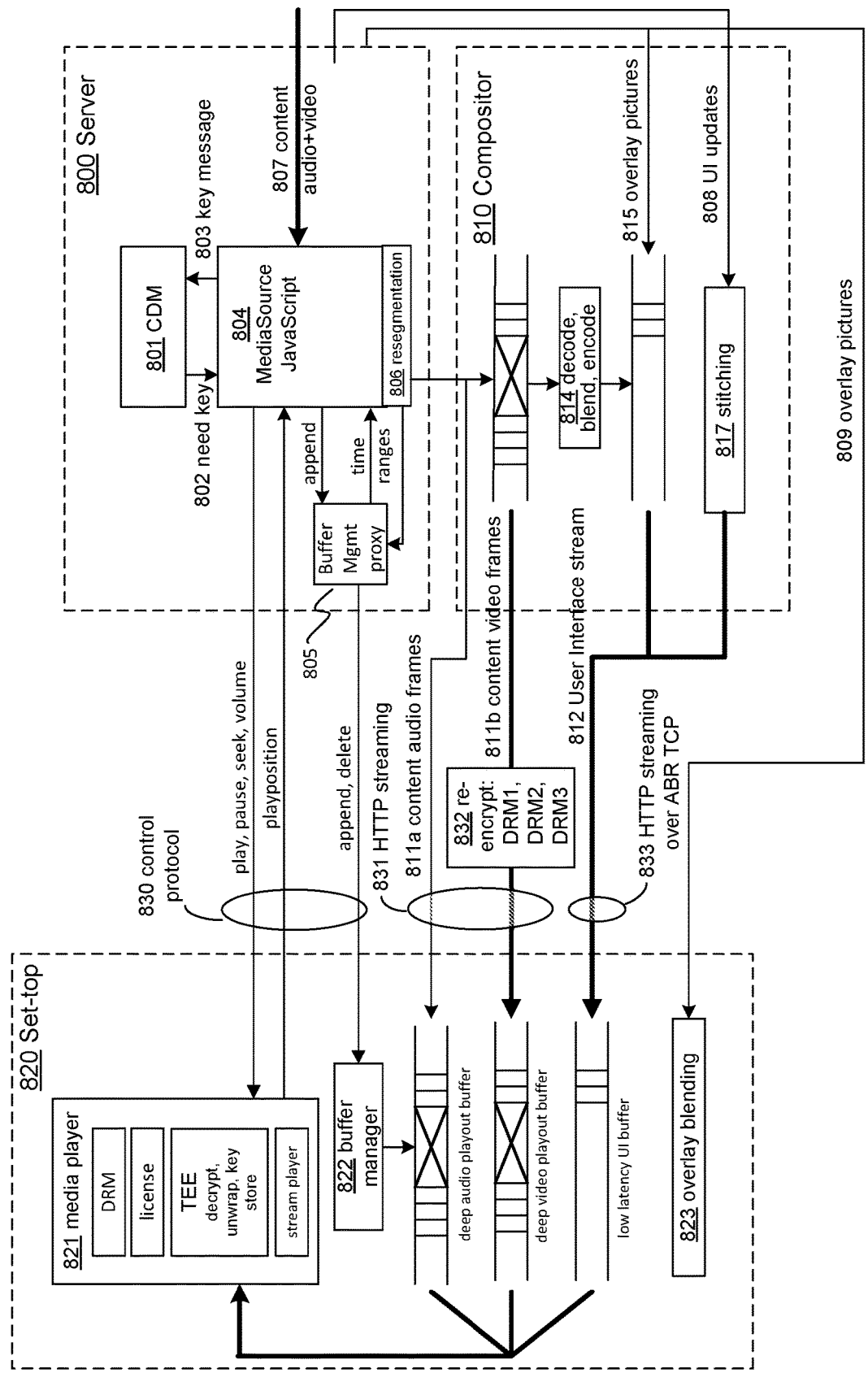
FIG. 8 is a block diagram of a media server system that provides secure content to a set-top box and can impose one or more DRM encryption types on media prior to transmission to a decoder in the set-top box, in accordance with some embodiments.

2. Fully implement the "Vendor A" DRM on the client, wrapped inside a content-decryption module (CDM) implementation. This will also result in a thick, full-featured client; however, the client-server interface running on the client is thinner than in Option 1 and will support multiple DRMs. An example of Option 2 is shown in FIG. 8, where re-encryption 832 allows for accommodating multiple DRM systems from a variety of third-party vendors.

Figure 7:
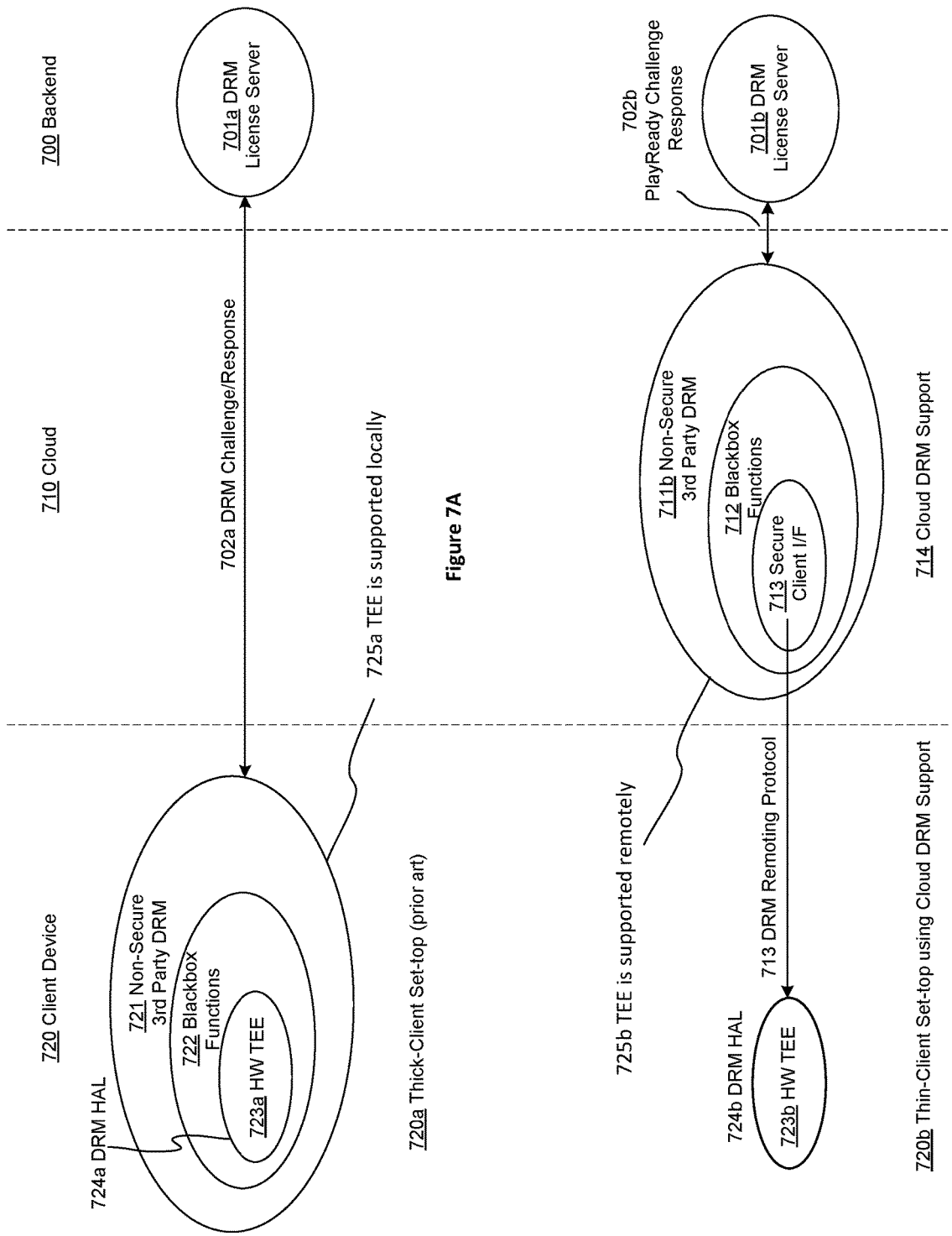
FIG. 7A is a high-level abstract representation of thick-client set-top DRM security management.
FIG. 7B is a high-level abstract representation of thin-client set-top DRM security management in accordance with some embodiments.

3. Implement only the functionality in the client that is common to all DRMs from all participating vendors, as well as any necessary functionality to keep the solution secure. This will lead to a truly thin client, yet with functionality similar to already-deployed solutions. An example of Option 3 is shown in FIG. 7, where the remote DRM support 714 functions are located on a cloud server 710 and securely communicated with the client set-top with the assistance of a DRM remoting protocol 713.

Option 1: Implement Full "Vendor A" DRM on the Client

This would be the currently available array of products for consumer set-top boxes for playback of digital media.

Option 2: Content-Decryption Module (CDM) Support in the Client

Option 2 results in an improvement in the client on the set-top boxes such that few computing resources are required to support a trusted execution environment and, hence, a lower cost per set-top can be realized than in Option 1, among many other advantages.

Option 3: Minimal Secure Client

For Option 3, functions are implemented in the client set-top box so that security hardware in the client set-top will be 'Vendor B'-ready and 'Vendor A'-ready, or more generally will be compatible with multiple DRM software architectures. In some embodiments, the client set-top box has a small-profile architecture with limited CPU and random access memory (RAM) resources, and thus is a thin client. The client set-top box includes a trusted execution environment (TEE), which, in some embodiments, includes hardware "root of trust," to comply with robustness rules (e.g., including those for high-definition content assets). A hardware root of trust is also known as a Trusted Platform Module (TPM). A TPM includes a secure crypto-processor, which is a dedicated microprocessor designed to secure hardware by integrating certain cryptographic keys into security components of set-top boxes. In some embodiments, a TPM is implemented in accordance with a standard (e.g., an international standard). For example, a TPM is implemented using a technical specification written by a computer industry consortium called "Trusted Computing Group" (TCG), which is a technical specification standardized by the International Organization for Standardization (ISO) and International Electrotechnical Commission (IEC) as ISO/IEC 11889 in 2009. Alternatively, a formally defined TPM is not used and any acceptable trusted computing platform that can be made as part of a client device for media playback and storage is used instead. The trusted computing platform includes a secure crypto-processor, in accordance with some embodiments.

The TEE protects access to cryptographic secrets, allowing those secrets to be used inside the TEE without risking exposure to unauthorized software that may be running on the same client or on a remote computer attempting to break into the client to obtain unauthorized access to decrypted content from the set-top. The TEE decrypts the encrypted content and then ensures that it is only sent to certain output ports (e.g., which connects to a media player that plays the decrypted content) to further protect the content if such action is called for by the policies set in the license that is associated with the content, with the TEE ensuring that it only decrypts the encoded content if adherence to the content-protection policies is verified.

The following subsections discuss the API functions and (conceptual) messages used to provide those functions when running on a client. In some embodiments, a minimum set of operations is supported (e.g., rather than the full set of operations identified by 'Vendor A'), to ease validation of the TEE.

"Vendor A" DRM

Figure 1:
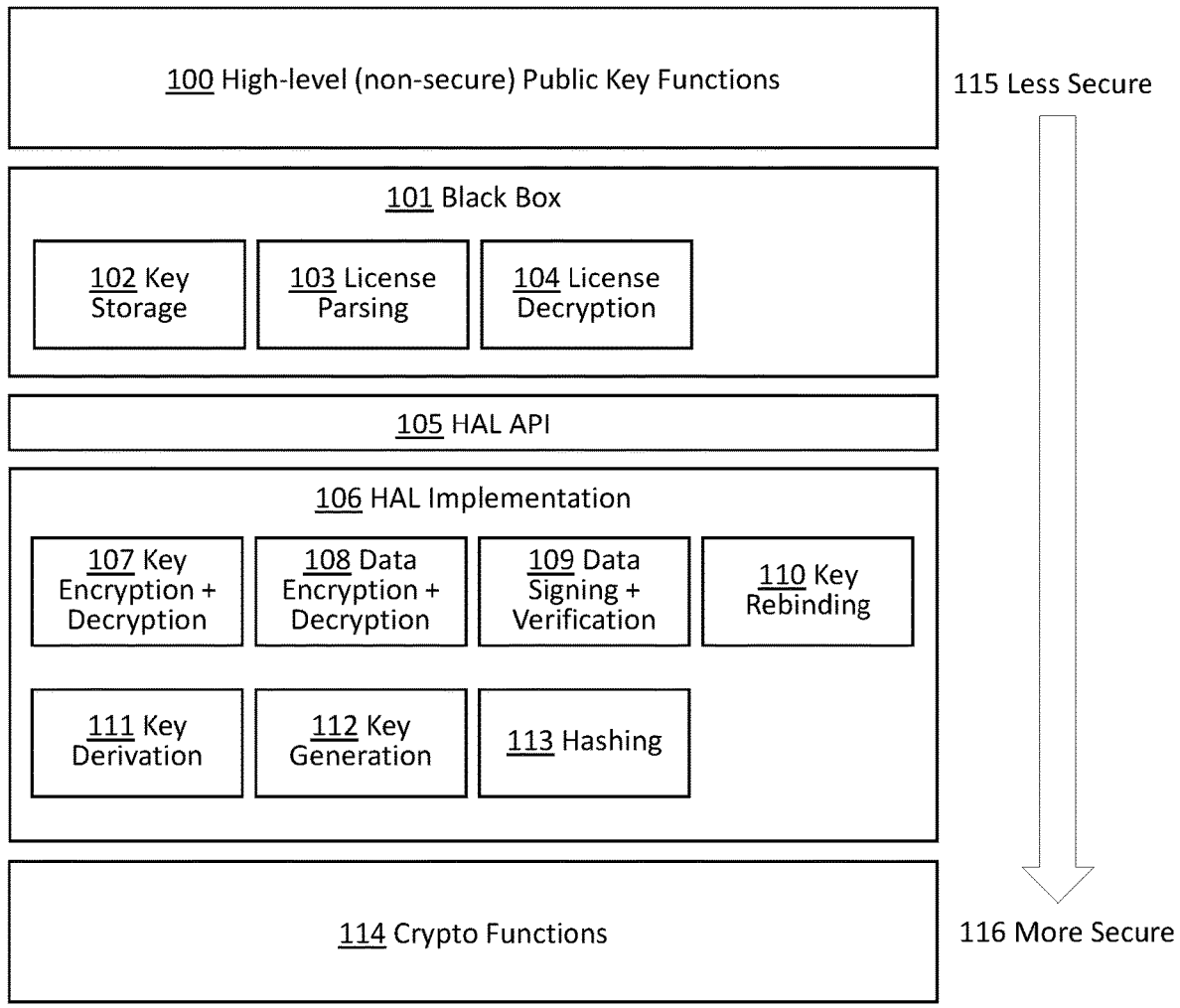
FIG. 1 shows a trusted execution environment (TEE) process stack in which the content-decryption module requirements for a first example of a commercially available DRM system are mapped to the functional capability of a TEE typically located in a client set-top box.

FIG. 1 shows the scope of the TEE in the 'Vendor A' software architecture. In some embodiments, the TEE of FIG. 1 is implemented in a set-top box engineered to decrypt a particular vendor's DRM (e.g., the DRM of Vendor A). The TEE includes the following layers, in order from less secure 115 to more secure 116: high-level public-key functions 100, a black box 101, a hardware-adaptation layer application-programming interface (HAL API) 105, a hardware-adaptation layer (HAL) implementation 106, and cryptographic functions 114. The black box 101 includes functions for key storage 102, license parsing 103, and license decryption 104. The functions of the black box 101 are not exposed outside of the black box 101 and thus are not accessible to other devices. The HAL implementation 106 includes functions for key encryption and decryption 107, data encryption and decryption 108, data signing and verification 109, key rebinding 110, key derivation 111, key generation 112, and hashing 113.

Figure 2A:
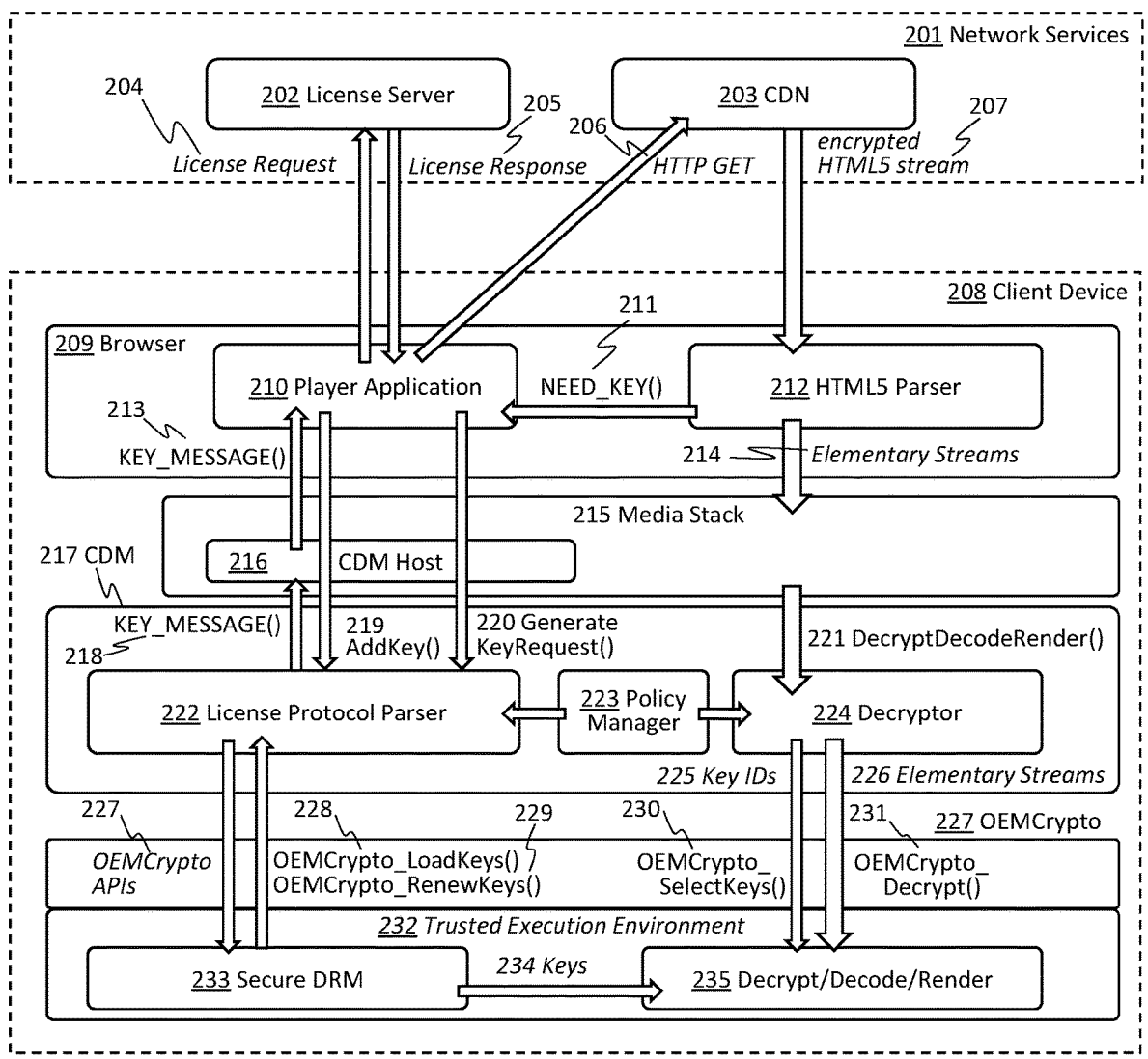
FIG. 2A shows a client device coupled to a license server and content delivery network (CDN), with content decryption module requirements for a second example of a commercially available DRM system mapped to the functional capability of a client set-top box's TEE.

In some embodiments, the following 'Vendor A' functionalities are supported by the TEE:
key reference management
wrapping and unwrapping of keys
message authentication
decryption of data
generating random keys
certificate management Thick-Client TEE FIG. 2A shows an example of a client device (e.g., set-top box) with a thick-client TEE. Such an environment might use or be configured similarly to "WideVine," which is commercially available from Alphabet Inc.'s Google division and which will be referenced as sourced from "Vendor B" in this description. In FIG. 2A, a client device 208 (e.g., a set-top box) is communicatively coupled to network services 201 provided by a license server 202 and content-distribution network (CDN) 203. The client device 208 includes a browser 209, media stack 215, CDM 217, cryptographic functions 227, and TEE 232. The cryptographic functions 227 may be defined by the original equipment manufacturer (OEM) (e.g., the set-top box manufacturer) and referred to as OEM cryptographic functions.

To play secure content, a player application 210 running on the browser 209 of the client device 208 sends a license request 204 to the license server 202 and receives a corresponding license response 205 from the license server 202. If the license response 205 approves the license request 204, the player application requests the secure content by sending an HTTP GET command 206 to the CDN 203, which responds by providing an encrypted HTML5 stream 207 (or other suitable encrypted stream) to the browser 209. An HTML5 parser 212 (or other suitable parser) in the browser 209 parses the encrypted HTML5 stream 207 to produce a still-encoded elementary stream 214, which is provided to the media stack 215. If a key is needed to decrypt the secure content, the HTML5 parser 212 provides a key request 211 (NEED_KEY( )) to the player application 210, which can provide an add-key request 219 and/or a generate-key request 220 to a license protocol parser 222 in the CDM 217. The license protocol parser 222, which operates in accordance with a policy manager 223, provides corresponding requests to a secure DRM implementation 233 in the TEE 232 through cryptographic APIs 227 (e.g., for a load-keys function 228 and/or renew-keys function 229). Based on responses from the secure DRM 233, the license protocol parser 222 provides key messages 218 to a CDM host 216 in the media stack 215 and key messages 213 to the player application 210. The media stack 215 provides the elementary stream 214 and a decrypt/decode/render command 221 to a decryptor 224 in the CDM 217. The decryptor 224, which operates in accordance with the policy manager 223, provides a key ID 225 to a select-key function 230 and an elementary stream 226 to a decrypt function 231, causing a decrypt/decode/render module 235 in the TEE 232 to decrypt, decode, and render the elementary stream 226. The module 235 performs the decryption using keys 234 received from the secure DRM implementation 233.

The client device 208 of FIG. 2A is a thick client, because of the computational demands resulted from implementing the browser 209, CDM 217, cryptographic functions 227, and TEE 232, among other processes, at the client device 208.

In some embodiments, the TEE 232 in the client set-top 208 will be slightly larger than the TEE supplied in the Vendor B technology. This is done to include the policy management, as performed by the policy manager 223, in the client set-top TEE 232 so as to ensure that it is not possible for an intruder to make the client set-top TEE 232 believe it is streaming to a content-protected output sink while, in fact, it is not. Including policy management in the TEE 232 thus helps to prevent content thieves from tapping into a set-top box and extracting potentially valuable media assets. While the license protocol parser 222 is shown in the CDM 217, in some embodiments the license protocol parser 222 is entirely within the client set-top TEE 232. In some other embodiments, the license protocol parser 222 is not entirely in the TEE 232; however, the part that validates the license and decides on allowable output formats is in the TEE 232. Examples of latter embodiments are disclosed below.

Thin-Client TEE

Figure 2B:
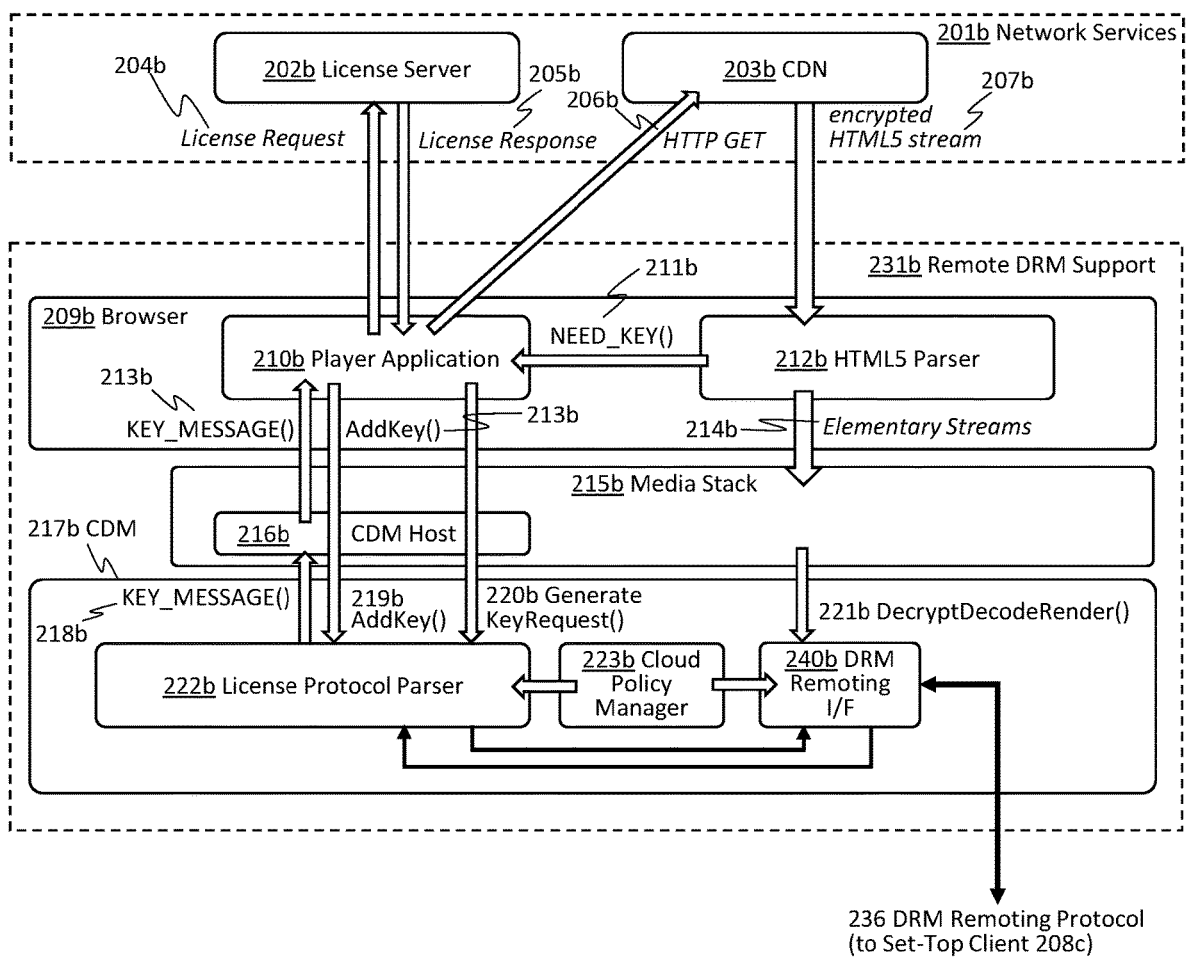
FIG. 2B shows cloud-based DRM support coupled to a license server, a CDN, and set-top clients, wherein the cloud-based DRM support provides DRM support to the set-top clients, in accordance with some embodiments.
Figure 2C:
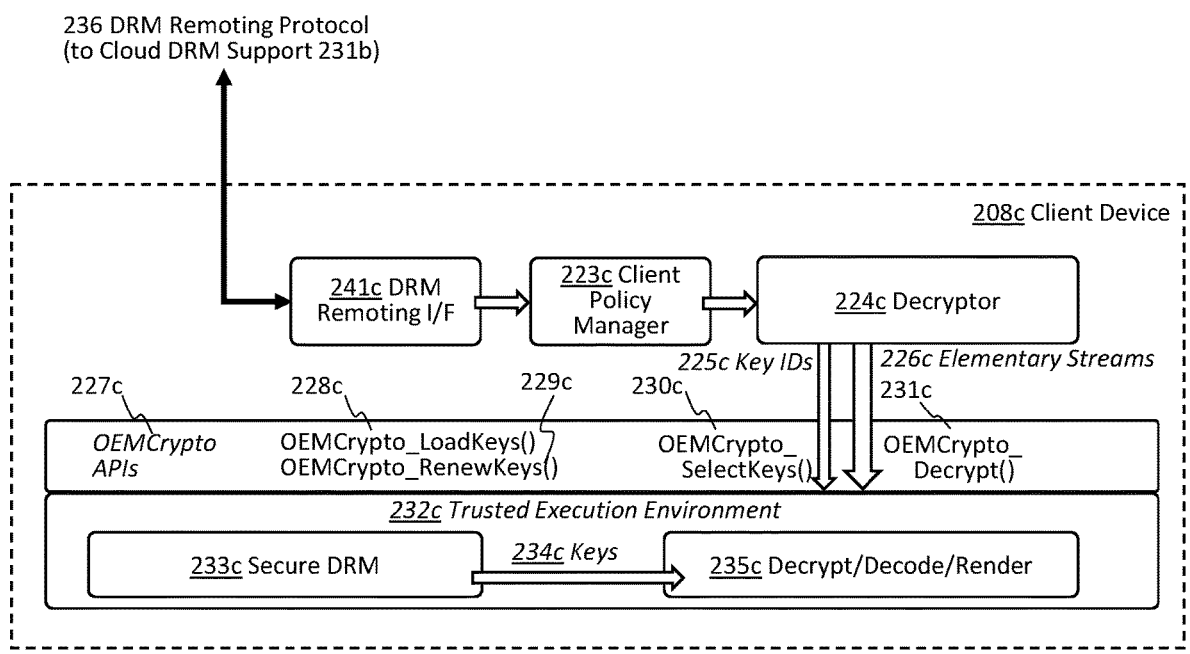
FIG. 2C shows aspects of a security mechanism in a thin-client set-top box coupled to the cloud-based DRM support of FIG. 2B, in accordance with some embodiments.

In FIG. 2B, certain aspects of the security mechanism of FIG. 2A are moved to a cloud-based network server, located for example in the headend of an MVPD, that provides remote DRM support 231b, in accordance with some embodiments. The remote DRM support 231b is part of a server system that provides a browser 209b, with a player application 210b and HTML5 parser 212b, that functions analogously to the browser 209 (FIG. 2A). The remote DRM support 231b includes a media stack 215b, with a CDM host 216b, that functions analogously to the media stack 215 (FIG. 2B). The remote DRM support 231b further includes a CDM 217b, which has a license protocol parser 222b and a policy manager 223b that function analogously to the license protocol parser 222 and policy manager 223 (FIG. 2A). The CDM 217b also includes a DRM remoting interface 240b, which acts as a secure interface between the remote DRM support 231b and the client device 208c (e.g., a set-top box) (FIG. 2C). The DRM remoting interface 240b uses a DRM remoting protocol 236 to communicate with the client device 208c. Elementary streams sent from the DRM remoting interface 240b to the client device 208c are encrypted, with decryption being performed at the client device 208c, thus maintaining security while offloading DRM business policy and other non-secure steps from the client device to the server.

The remote DRM support 231b provides non-secure, though thoroughly protected, aspects of DRM support for a multiplicity of client set-top boxes. The remote DRM support 231b provides authentication and policy management to the client device 208c (e.g., set-top box) to enable the TEE 232c (FIG. 2C) of the client device 208c to decrypt and decode video programming for display on a connected display device.

As shown in FIG. 2C, the client device 208c includes a DRM remoting interface 241c for communicating with the DRM remoting interface 240b (FIG. 2B) using the DRM remoting protocol 236. Based on messages receiving at the DRM remoting interface 241c, a client policy manager 223c controls a decryptor 224c, which operates by analogy to the decryptor 224 (FIG. 2A). The client device 208c also includes cryptographic APIs 227c (including functions 228c, 229c, 230c, and 231c) and a TEE 232c (including secure DRM 233c that provides keys 234c to decrypt/decode/render module 235c), which function by analogy to their counterparts in FIG. 2A. The client device 208c thus performs the final security steps of decryption and decoding of video programming using its TEE 232c. The offloading of DRM functionality from the client device 208c to a server in the cloud (e.g., in the headend) allows the client device 208c to be implemented as a thin client device.

Furthermore, the pieces of the CDM 217b relating to how keys are derived, certificates are signed, and what licenses look like, are outside the TEE 232c. This allows generic (e.g., vendor-independent) TEE functionality to be provided in the set-top client 208c, allowing multiple DRMs to be built into the remote DRM support (e.g., remote DRM support 231b) in the server, including in servers that are "in The Cloud". Multiple DRM schemes (e.g., including new DRM schemes developed after the client device 208c) may thus be supported without updating the set-top client device 208c.

Splitting Commercial DRM Systems

Third-party DRMs can be divided into a piece that executes on the server that may be in The Cloud, a piece that executes in a so-called "black box" on the client, and a piece that executes on a TEE on the client. A remoting protocol is used between the cloud server and the client black box. The remoting protocol includes function calls that are run to support a given media service such as 'Content Provider X' or 'Content Provider Z' video-on-demand services.

Figure 3:
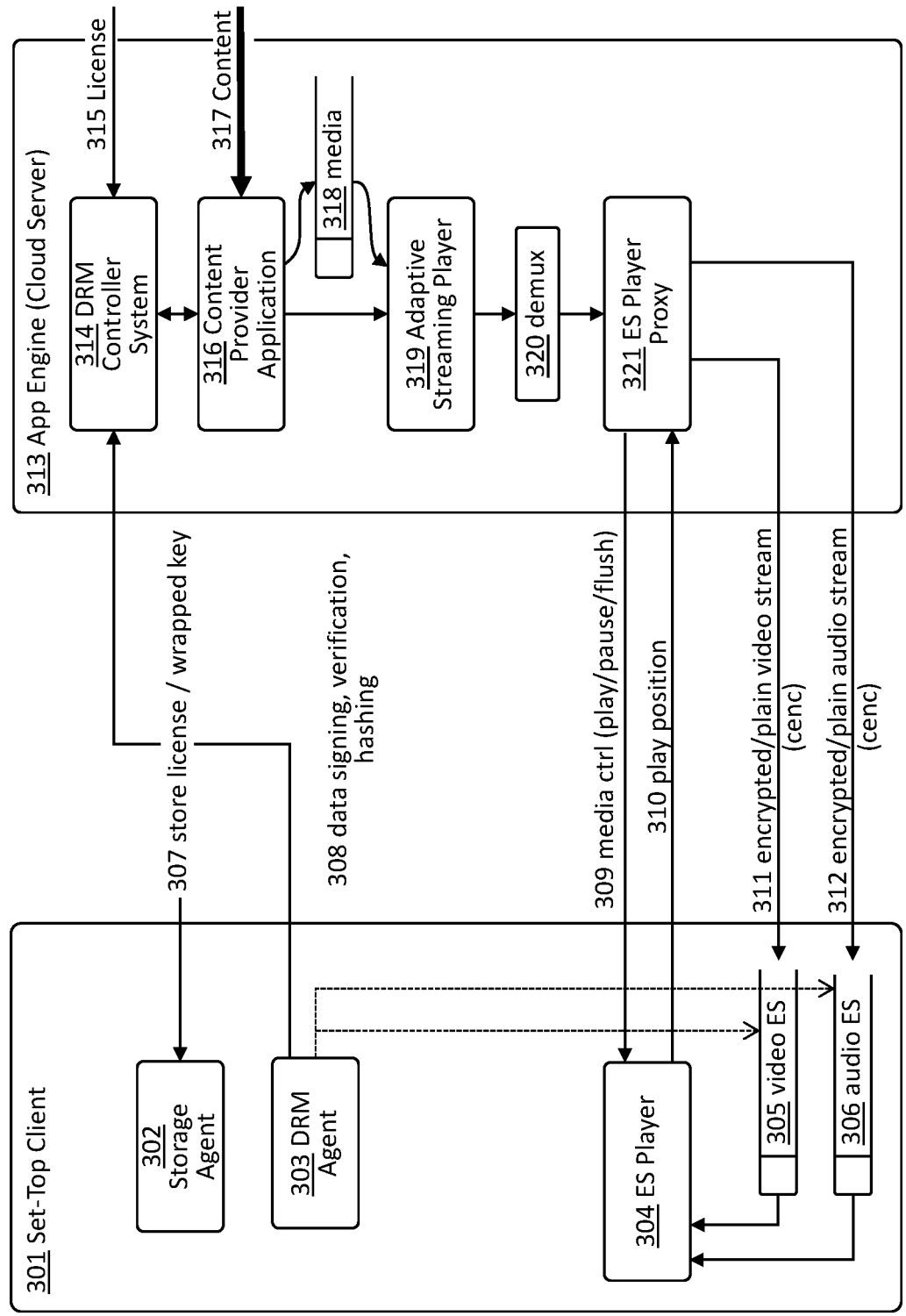
FIG. 3 shows an application programming interface (API) for a remotely supported TEE in accordance with some embodiments.

FIG. 3 shows an application programming interface (API) for a remotely supported TEE (e.g., the TEE 232c, which is remotely supported by the remote DRM support 231b) in accordance with some embodiments. A set-top client 301 (e.g., client software running on a thin-client STB such as client device 208c) is communicatively coupled to an application engine 313 running on a server in the cloud (e.g., at a headend). The set-top client includes a storage agent 302, DRM agent 303, elementary stream (ES) player 304, video ES queue 305, and audio ES queue 306. The DRM agent 303 includes, for example, the components of the client device 208c shown in FIG. 2C. The application engine 313 includes a DRM controller system 314, content provider application 316, adaptive streaming player 319, demultiplexor (demux) 320, and ES player proxy 321. The application engine 313 corresponds to the remote DRM support 231b (FIG. 2B) in accordance with some embodiments. Such commercial products as PlayReady and WideVine could be considered examples of the DRM controller system 314. Netflix could be an example of a content provider application 316.

The DRM controller system 314 receives a license (e.g., from the license server 202b, FIG. 2B) and sends the license 307 to the storage agent 302, which stores the license. In some embodiments, the DRM controller system 314 also provides a wrapped key 307 (i.e., a first key wrapped using a second key) to the storage agent, which stores the wrapped key. The DRM agent communicates with the DRM controller system 314 regarding data signing, verification, and hashing 308. The content provider application 316 receives content 317 and, under the control of the DRM controller system 314, provides the content to the adaptive streaming player 319 (e.g., via a media queue 318), which outputs the content through the demux 320 to the ES player proxy 321. The ES player proxy 321 sends media control commands 309 (e.g., play/pause/flush) to the ES player 304 and receives the play position from the ES player 304. The ES player proxy 321 send video streams (e.g., encrypted or unencrypted/plain) to the video ES queue 305 and audio streams (e.g., encrypted or unencrypted/plain) to the audio ES queue 306. Encrypted video in the video ES queue 305 is decrypted under the control of the DRM agent 303 (e.g., as described for FIG. 2C), using an unwrapped key from the storage agent 302. Similarly, encrypted audio in the audio ES queue 306 may be decrypted under the control of the DRM agent 303.

In some embodiments, the DRM agent in the set-top client 301 periodically transmits (e.g., at a periodicity of perhaps ten times per second) the key used to decrypt content to the application engine 313 in the server. If the key does not match the key provided by the application engine 313, unauthorized access, popularly called a "hack," is assumed and content provisioning halts: the application engine 313 stops transmitting the video stream 311 and/or audio stream 312 to the set-top client 301. In some embodiments, the ES player proxy 321 translates the content from a first encrypted format to a second encrypted format that can be decoded by the ES player 304.

Figure 4:
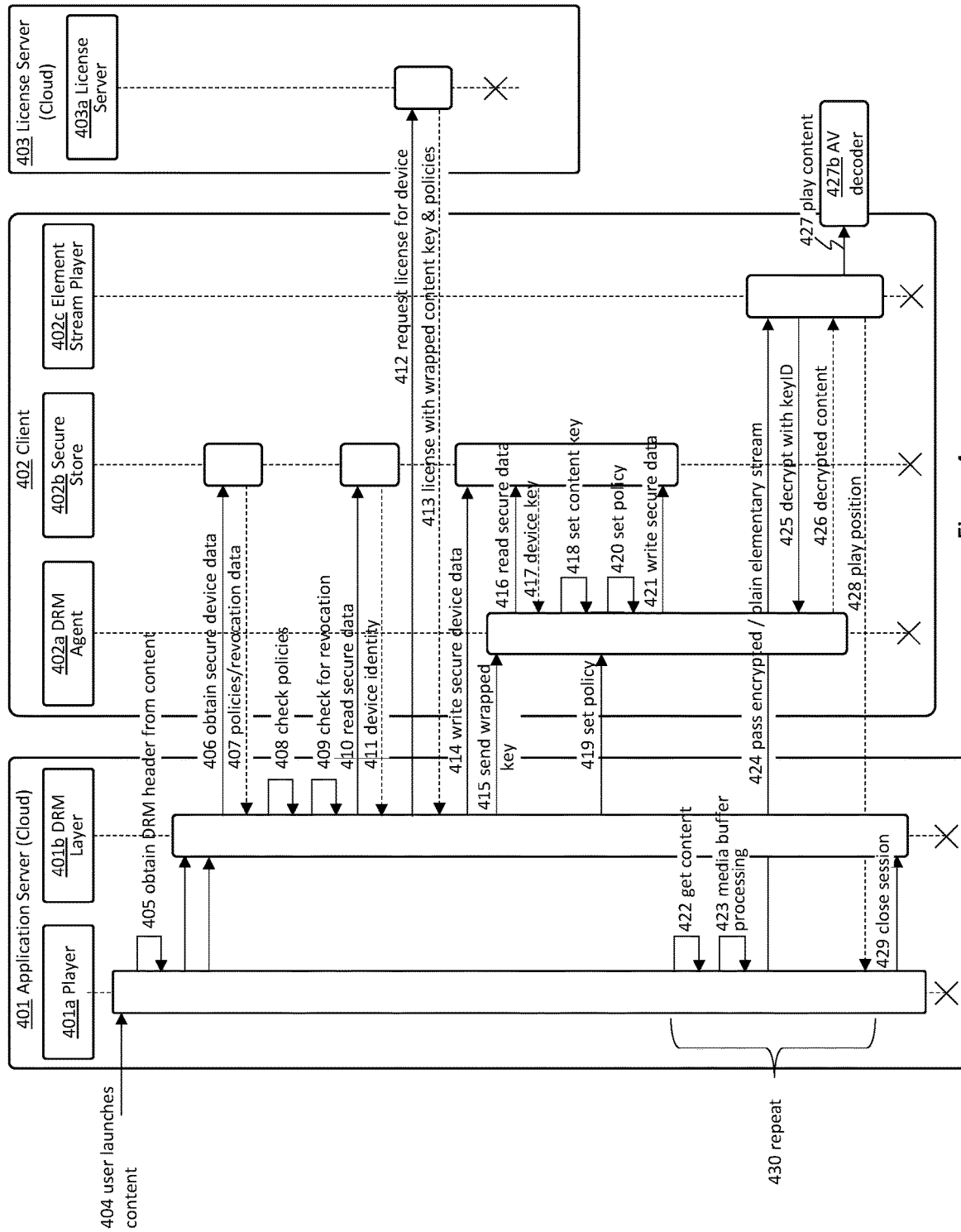
FIG. 4 is a state diagram showing a message flow between a DRM server, set-top client (i.e., set-top box), and license server for authenticating the client and enabling the client to decrypt and decode previously encrypted media, in accordance with some embodiments.

FIG. 4 is a schematic diagram showing a message flow between an application server 401 in the cloud (e.g., in the headend), set-top client 402, and license server 403 for authenticating the set-top client 402 and enabling the set-top client 402 to access encrypted media, in accordance with some embodiments. The application server 401 includes a player 401a and DRM layer 401b. The application server 401 executes the application engine 313 (FIG. 3) and provides remote DRM support 231b in accordance with some embodiments. The set-top client 402 includes a DRM agent 402a (e.g., DRM agent 303, FIG. 3), secure store 402b (e.g., corresponding to the storage agent 302, FIG. 3), and ES player 402c (e.g., ES player 304, FIG. 3). The set-top client 402 corresponds to the client device 208c in accordance with some embodiments. The message flow of FIG. 4 works with multiple DRM architectures including by way of example those from both Vendor A and Vendor B (e.g., only those from both Vendor A and Vendor B).

The process of FIG. 4 begins when a user of the set-top client 402 launches secure content. The player 401a obtains the DRM header from the content. The DRM layer 401b queries the secure store 402b for the secure device data 406 for the set-top client 402. The secure store 402b responds with the relevant policy and revocation data 407. The DRM layer 401b checks 408 the policy data and checks 409 for revocation. In this manner the DRM layer 401b verifies the user's account information. The DRM layer 401b reads secure data 410 from the secure store 402b and receives the device identity (e.g., unique serial number) for the set-top client 402. Using this information, the DRM layer 401b queries the license server 403 (e.g., license server 202b, FIG. 2B) for a license 412 for the set-top client 402 and receives a license with a wrapped content key and policies (e.g., business rules) 413 in response.

The DRM layer 401b writes secure device data 414 to the secure store 402b and sends the wrapped key 415 to the DRM agent 402a, which reads the secure device data 416 from the secure store 402b and receives the device key 417 (e.g., the key provided by the manufacturer of the client device) for the set-top client 402 in response. The secure device data 414 includes the unique client device ID and other credentials used to obtain delivery of DRM keys from the DRM layer 401b. The DRM agent 402a uses the device key to unwrap the wrapped key received from the DRM layer 401b, thereby setting the content key 418. The DRM layer 401b also provides policy data 419 to the DRM agent 402a, which sets the policy (e.g., the business rules) 420 under which the set-top client 402 can access the secure content accordingly. The DRM agent 402a writes secure data 421 (e.g., corresponding to the policy and/or including a key or partial key) to the secure store 402b.

The player 401a obtains the secure content 422 (e.g., from a CDN 203b, FIG. 2B), buffers the secure content (e.g., in queue 318, FIG. 3), performs media-buffer processing 423 for the buffered secure content (e.g., to create an elementary stream), and sends the corresponding elementary stream 424 to the ES player 402c in the set-top client 402. Assuming the content is indeed secure, the elementary stream 424 is encrypted. Otherwise, the elementary stream may be unencrypted (i.e., plain) for use, for example, in displaying promotional previews or user-interface sessions. The ES Player 402c commands 425 the DRM agent 402a to decrypt the encrypted elementary stream, which the DRM agent 402a does using the content key. The DRM agent 402a provides the decrypted content 426 to the ES player 402c, which provides the decrypted content 427 to a decoder 427b, which decodes the content. The ES player 402c also provides the play position 428 to the player 401a, which uses the play position to continue to provide content to the set-top client 402. The operations 422 through 428 are repeated as playback continues. The player 401a closes the session 429 for the set-top client, for example when playback of the secure content is complete or the user ends playback.

In this manner, the content is securely provided to the set-top client using a DRM to which the set-top client 402 may be agnostic, and is played back on a display device (not shown) that is associated with the set-top client and receives output from the decoder 427b. The use of a wrapped key to decrypt the content allows the set-top client to be compatible with multiple DRM schemes without implementing full DRM functionality. The set-top client thus may be a thin client which is advantageous to the MVPD operations for both technical and business reasons.

Figure 5:
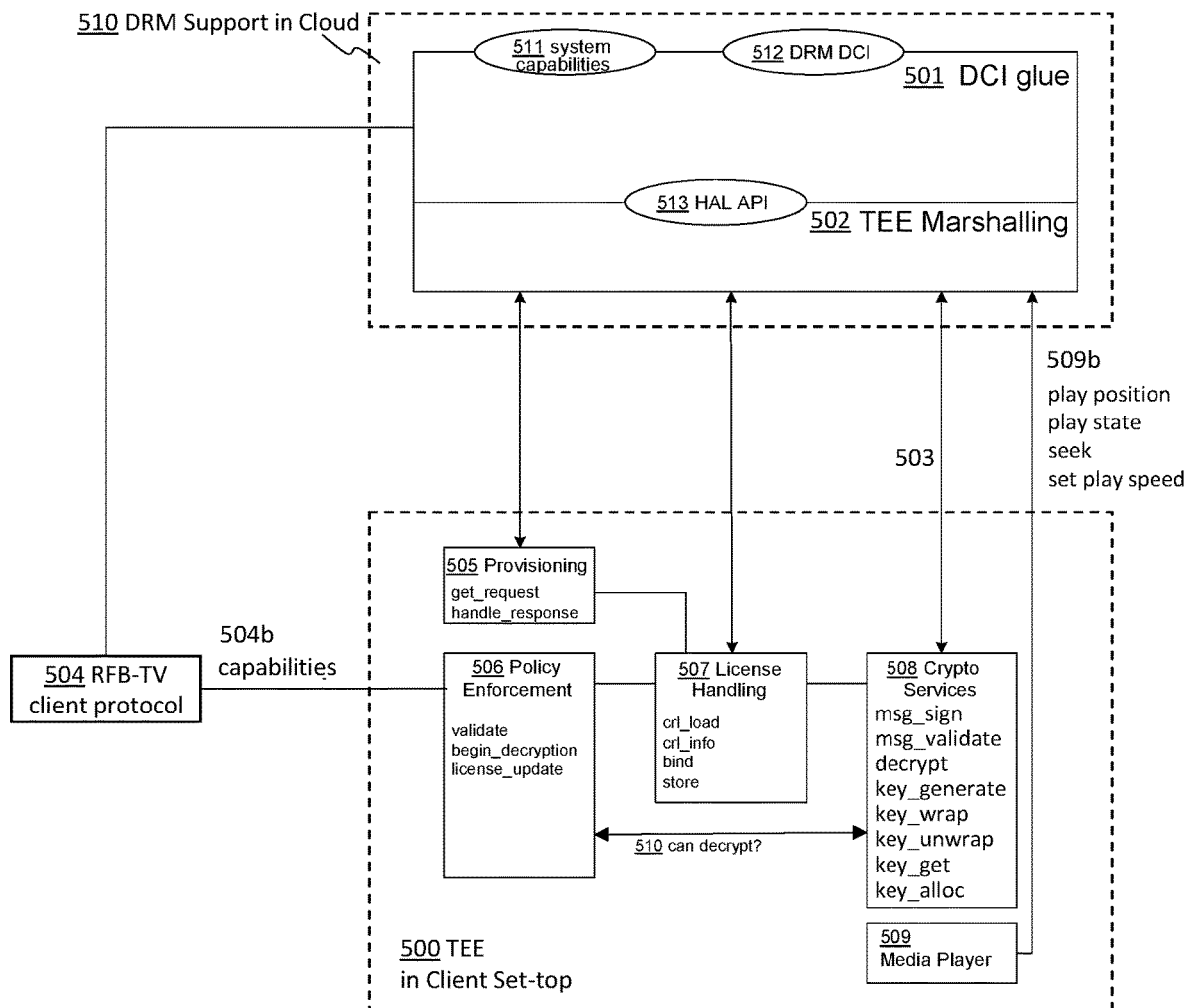
FIG. 5 is a block diagram of server-to-client DRM management functions for a remotely supported TEE architecture in accordance with some embodiments.

FIG. 5 is a block diagram of server-to-client DRM management functions for a remotely supported TEE 500 architecture in accordance with some embodiments. The remotely supported TEE 500 is implemented in the set-top client device and is remotely supported by DRM support 510 in the cloud (e.g., at the headend).

The TEE 500 includes:

Provisioning 505, which requests content and handles responses;

Policy enforcement 506, which performs validation, begins decryption, and updates the license for the client device. The policy enforcement 506 operates in accordance with capabilities 504b of the client device, as communicated with the DRM support 510 using a remote-frame-buffer (RFB) TV client protocol 504;

License handling 507;

Cryptographic services 508, which provides cryptographic functions; and

A media player 509.

The DRM support 510 includes TEE marshalling 502 and a device control interface (DCI) glue 501. The TEE marshalling 502 includes a HAL API 513. The DCI glue includes a DRM DCI 512 and a system-capabilities module 511. The DRM support 510 communicates with the provisioning 505, policy enforcement 506, license handling 507, cryptographic services 508, and media player 509, as described for example with respect to FIGS. 2B, 2C, 3, and/or 4. The policy enforcement 506 and cryptographic services 508 determine whether the TEE 500 can decrypt 510 the secure content.

FIGS. 7A and 7B compare DRM for a thick-client set-top box (FIG. 7A) to a remotely supported TEE in a thin-client set-top box (FIG. 7B) (e.g., a thin client as described with respect to FIGS. 2B-5) in accordance with some embodiments. In FIG. 7A, a client device 720a (e.g., a set-top box) implements non-secure third-party DRM 721, which includes a black-box interface 722 to a DRM HAL 724a that implements a hardware TEE 723a. DRM challenges and responses 702a are transmitted between the client device 720 and a DRM license server 701a in backend 700. The inclusion of the full DRM 721 in the client device 720a results in the client device 720a being a thick client.

In FIG. 7B, by contrast, the DRM functionality in a client device 720b (e.g., a set-top box) does not include the DRM 721 or black-box 722, but instead includes a DRM HAL 724b with a hardware TEE 723b. Non-secure third-party DRM 711b is implemented at a server 710 that provides cloud DRM support 714. The DRM 711b includes a black-box interface 712 with a secure client interface 713 (e.g., DRM remoting interface 240b, FIG. 2B) that communicates with the TEE 723b using a DRM remoting protocol 713 (e.g., DRM remoting protocol 236, FIGS. 2B-2C). DRM challenges and responses 702b are transmitted between the DRM 711b and a DRM license server 701b in backend 700. FIG. 7B as compared to FIG. 7A thus moves certain non-secure DRM elements to a server to support a multiplicity of client set-tops with authentication and business logic functions, thus reducing the complexity of the client set-top device 720b and compared to the client set-top device 720a. The TEE 723 remains in the client set-top device 720 and, upon authorization by the remote DRM support 714 performs the final steps of decrypting and decoding video programming.

FIG. 8 is a block diagram of a media server system providing secure content to a set-top box where one or more DRM encryption types can be imposed on media prior to transmission to a decoder in the set-top box, in accordance with some embodiments. A corresponding DRM decryption container is invoked in the set-top box, which allows the set-top box to decrypt multiple vendors' DRM and then share a common video decoder for playback.

In the system of FIG. 8, the set-top 820 includes a media player 821 with DRM, license parsing, a TEE, and a stream player. The set-top 820 also includes a buffer manager 822, which manages buffers (i.e., queues) including a deep audio playout buffer, deep video playout buffer, and low-latency UI buffer. The TEE decrypts content from the buffers managed by the buffer manager 822. The set-top 820 may further include an overlay blending module 823 to overlay/blend pictures 809 from the server 800.

The server 800 of FIG. 8 includes a CDM 800 and executes a media source script (e.g., Javascript) 804 that receives audio and video content 807 to be provided to the set-top 820 and controls the media player 821 in the set-top 820. For example, the media source script 804 provides play, pause, seek, and volume commands to the media player 821 and receives the playback position from the media player 821 (e.g., using a control protocol 830). The media source script 804 is coupled to a buffer management proxy 805 in the server 800 that sends commands (e.g., append and delete commands) to the buffer manager 822 in the set-top 820. The media source script 804 provides commands to the buffer management proxy 805 and receives buffer time ranges from the buffer management proxy 805. The media source script 804 receives key requests 802 from the CDM 801 and provides key messages 803 to the CDM 801. A resegmentation module 806 associated with the media source script 804 provides commands to a compositor 810, which is shown as being separate from the server 800 but may be implemented in the server 800.

The compositor 810 streams audio frames 811a and video frames 811b to the set-top 820 (e.g., via HTTP streaming 831). A re-encryption module 832 re-encrypts the video frames 811b in accordance with a selected DRM scheme of a plurality of DRM schemes, thus providing DRM bridging (i.e., bridging between multiple DRM schemes). The re-encryption module 832 is shown as being separate from the server 800 and compositor 810 but may be implemented in the server 800 and/or compositor 810. The compositor 810 may include a decode/blend/encode module 814 that overlays pictures 815 to produce blended images. The compositor 810 may also include a stitcher 817 to generate user interfaces in accordance with user-interface (UI) updates 808. Output from the blending and stitching processes are streamed in a UI stream 812 to the set-top 820 (e.g., using HTTP streaming 833).

Session Management

A session API is used to manage the session and enable creating crypto context. Once the session is stopped all stored crypto context is destroyed.

Key Register Management

The TEE maintains a table of key registers. A key register is identified using an index. A key includes the key type (how is the key to be used) and the binary data of the key. The key type allows the TEE to perform verification as to whether a provided key can be used for the purpose intended. Before a key register can be used, it is allocated.

Allocate Key Register Procedure

The AllocateRegister procedure allows the server to allocate a key in the TEE. This reserves a key register index, which can be filled using a separate procedure. The server sends the AllocateRegisterRequest message, which is responded to by the AllocateRegisterResponse.

The AllocateRegisterResponse will contain a result code and, if the result code indicates success, the RegisterIndex parameter will indicate the allocated key register index. Other result codes allow the client to indicate various error conditions, such as no room available in the key register table. The free parameter indicates the number of free positions after the allocation has been done, so that the server knows in advance when the key register table is full.

FreeKeyRegister Procedure

This procedure frees a previously allocated key register.

Get Key Register Count Procedure

The Get Key Statistics Procedure allows the server to get basic information about the key table residing on the client. The server can set the KeyType to a specific key type to count the number of keys in use for that key type, or it can set the key type to 'All'.

When KeyType indicates 'All', then 'count' plus 'free' will be equal to 'total'.

In some embodiments, the remotely supported TEE in the client device locally caches the number of free positions, to avoid having to count prior to attempting to allocate.

Get Preloaded Key Index

In some embodiments, the TEE comes with a number of pre-loaded keys, such as device type specific keys or device unique keys. The server can locate certain keys by ID, so that it can refer to those keys using a reference index.

In some embodiments, the TEE message definition will not include a list of known Key IDs. This depends on the DRM scheme used and what keys are provisioned at TEE manufacturing time.

Wrapping and Unwrapping Keys

Keys enter the TEE in the client device in wrapped form allowing them to transit unprotected networks. Keys are unwrapped in the TEE and remain there until they are discarded. A key can only leave the TEE after wrapping it with another secret key.

In some embodiments, when wrapping a key, the input is a key register that holds the key to be wrapped, and a key register that holds the wrapping key. The output (the wrapped key) is returned as bytes.

In some embodiments, when unwrapping a key, the reverse takes place: the inputs are bytes and a key register that holds the unwrapping key. After unwrapping, the result is placed in a key register.

Message Authentication

In some embodiments, message authentication is done using asymmetric encryption and a key-pair. In some embodiments, message authentication is done using symmetric encryption using the AES-OMAC1 algorithm with a specific key.

Decryption of Data Decryption of data is not exposed outside the TEE and hence no remoting messages are made available as such. However, a TEE implementation may expose decryption functions to the trusted memory space depending on the client hardware.

Assumptions

The HAL API assumes that:
 the client TEE does not encrypt media data (samples)
 encryption contexts are only used for encrypting media data Storage on the Device 'Vendor A' normally stores the following information in corresponding stores on a set-top box:
 License Store: contains licenses obtained from a 'Vendor A' license server. Primary index is a Key ID (KID) which is a globally universal ID (GUID) that identifies a content key. Secondary index is the License ID (LID) which uniquely identifies a license. A priority order is stored to enable licenses to be searched in priority order.
 Domain Store: a set-top box can be a member of one or more secure domains. Content can be bound to a secure domain. A secure domain has private keys, which are encrypted by the set-top box's private key. A secure domain has a certificate. A secure domain has a domain ID that includes a service ID (identifies the service provider), account ID (unique across service providers), and revision of the secure domain. The domain store contains the domain certificate and private keys.

Metering Data Store: contains metering data for content files that require metering. For example, the metering data tracks a time period within which a content file can be accessed and/or a number of times that a content file can be accessed. Indexed primarily by Metering ID (MID) and secondarily by Key ID (KID). The metering data contains a Transaction ID (TID) which is newly generated each time the metering data is reset for the MID. The metering data store contains the KID, an action identifier, and a counter.

Metering Certificate Store: contains metering certificates received from the license server.

Secure Store: contains DRM state data (e.g. license state data, revocation lists, and last loaded time). All entries are secured by a hash that includes the data, a unique identifier, and the private key of the set-top box.

Synchronization Store: contains a list of licenses that expire or become used up (due to metering) and that need to be synchronized with another device (e.g., a computer).

Certificates

In some embodiments, the "Vendor A" product includes the following certificates (top to bottom):

Company certificate—certificate used to sign the firmware certificate and/or contract manufacturer certificate. The company certificate is only used for certificate signing. The company is the manufacturer of the set-top box in accordance with some embodiments.

Contract-manufacturer certificate—if Company uses a contract manufacturer, Company issues and signs a unique contract-manufacturer certificate for use by the contract manufacturer on behalf of Company. The contract-manufacturer certificate is only used for certificate signing.

Firmware certificate—unique certificate for each instance of a 'Vendor A' product. The firmware certificate is also known as model certificate. The firmware certificate is signed with the private key corresponding to either the Company certificate or the contract-manufacturer certificate. Each firmware version has its own unique certificate.

Device certificate—certificate issued by Company or contract manufacturer for inclusion in each model or firmware/revision manufactured by or on behalf of Company. The device certificate is signed with the private key corresponding to the firmware certificate. The device certificate is used for Key Encryption (i.e. the content key obtained from the license server).

In addition to the aforementioned certificates, the certificate chain includes another certificate, in accordance with some embodiments:

Device root CA certificate—this is the topmost certificate in the chain. It contains information that validates the certificate chain to a known root. This certificate also contains the public key for the device root certificate authority (CA) certificate, which is generated and maintained by the vendor (e.g., Microsoft Corporation). The private key corresponding to the device root CA certificate is used to sign the Company certificate.

Robustness

Any acceptable solution should be secure and robust. For example, Vendor A qualification for service can only be achieved if keys and secrets can only be discovered, obtained, and/or used with proper authority and can be shown to be secure from intruders (e.g., hackers) by acceptable standards.

In some embodiments, secure access and modification of the following trusted values is provided:

Device secrets—protects various protocol keys and ID's needed for device validation Serial number—a unique ID of the set-top box Secure clock (if supported))—a protect clock to prevent a hacker from resetting the set-top box's internal clock to protect revocation data to preserve media viewing timeout Revocation data—data used to determine when viewing time has expired (e.g. after 48 hours of check-out)

Protocol secrets—encrypted handshake codes

Secure code (secure boot, secure update, remote provisioning)—ensures set-top box cannot be started up using alternate software to take over control and allow hacker entry.

Output protection state-ensures decrypted context exits device with appropriate protection such as when set-top output video to HDTV monitor via HTMI interface has HDCP protection imposed, among other examples.

Policies

Policies in a DRM framework are associated with the content and define what is allowed with the content such as possible output paths and restrictions (e.g. output via digital output, copy, play once, only play within a specified period). Several features of policies such as the allowed output path are ultimately implemented on the client. Thus low-level policy settings are transferred to the client in a secure manner such that commands cannot be tampered with.

Policy Delivery

Policies are delivered as objects in the license certificates obtained from the license server.

Figure 6:
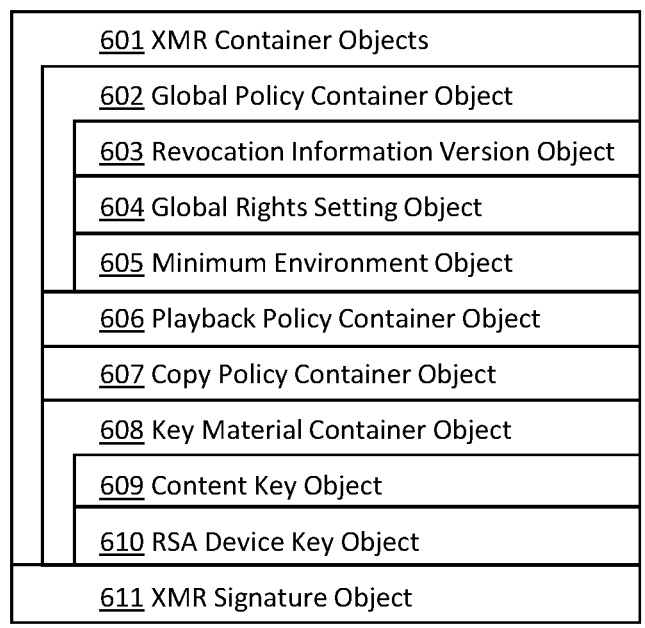
FIG. 6 shows an Extensible Media Rights (XMR) header data structure that, in accordance with some embodiments, defines a data record structure in XML format for communicating DRM information between trusted computing elements.

FIG. 6 shows an Extensible Media Rights (XMR) header structure defining a data record structure 600 in XML format for communicating DRM information between trusted computing environments, in accordance with some embodiments. For example, the data record structure 600 is used for messages sent between client devices (e.g., set-top boxes) and a server in the cloud (e.g., in the headend) described with respect to FIGS. 2B, 2C, 3, 4, 5, 7, and/or 8. The data record structure 600 includes one or more XMR container objects 601 and an XMR signature object 611. Each XMR container object 601 includes a global policy container object 602, playback policy container object 606, copy policy container object 607, and key material container object 608. The global policy container object 602 includes a revocation information version object 603, global rights setting object 604, and minimum environment object 605. The key material container object 608 includes a content key object 609 and RSA device key object 610. An object that is not relevant to or absent from a particular message may be omitted from the message.

Client Authentication

A secure tunnel is established between client and server to protect the sensitive control data such as policy settings obtained from the parsed license.

Examples of Implementations

The functionality described herein, for the server and/or the client, may be embodied in many different forms, including by way of example only but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, by way of example only but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The storage medium may be a non-transitory computer-readable storage medium (e.g., nonvolatile memory). The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server over a communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server over the communication system (e.g., the Internet or World Wide Web).

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

Acronym Expander Table
API Application Programming Interface (a general term for a software interface to software system)
CDN Content Delivery Network (servers and a network for delivery of on-demand media)
CDM Content Decryption Module (a module to provide the decryption keys for a TEE to decrypt a media asset)
CRM Certificate Revocation Management (a function to manage when the viewing time of a media asset has expired—for example, a feature film may only be viewed for a specified time period after check-out.)
DCI Device Control interface (a system-specific interface for device control)
DRM Digital Rights Management
HAL Hardware Adaption Layer
MVPD Multichannel Video Programming Distributor (typically a cable or satellite operator)
RFP Remote Frame Buffer (an open standard for conveying the image of a computer desktop to a remote display)
TEE Trusted Execution Environment (typically a hardware implementation for executing a DRM procedure to enabling the decryption and decoding of media assets such as movies on-demand)
TPM Trusted Platform Module (a security module executed within a TEE)
XMR Extensible Media Rights (an XML structured data record for the exchange of DRM and other security information)

What is claimed is:
1. A method, comprising:
at a client device distinct from an application server:
  storing a first key in a secure store of the client device;
  receiving a wrapped second key from the application server;
  retrieving the first key from the secure store;
  using the first key to unwrap the second key;
  receiving encrypted media content from the application server;
  receiving, from a player proxy at the application server, a media control command to control playback of the received encrypted media content;
  decrypting the encrypted media content using the unwrapped second key;
  decoding the decrypted media content for playback;
  during playback of the decrypted media content, transmitting, to the player proxy at the application server, a play position of the decrypted media content, wherein:

the play position of the decrypted media content is used by the player proxy at the application server to continue providing the encrypted media content, and the play position is transmitted to the application server repeatedly while playback of the decrypted media content continues; and transmitting, to a display device that is coupled to the client device, the decrypted media content, wherein the decrypted media content is displayed in accordance with the media control command received from the player proxy.

2. The method of claim 1, wherein the received media control command comprises a command to play, pause, or flush.

3. The method of claim 1, wherein receiving the encrypted media content from the application server comprises receiving an encrypted elementary stream from the application server.

4. The method of claim 3, wherein decrypting the encrypted media content comprises:
providing a decryption command from an elementary-stream player executing on the client device to a digital-rights-management (DRM) agent executing on the client device, the decryption command specifying the unwrapped second key; and
decrypting the encrypted media content using the unwrapped second key at the DRM agent.

5. The method of claim 1, wherein:
the first key is a device key provided by a manufacturer of the client device; and
the second key is associated with a DRM scheme specified by a content provider of the encrypted media content.

6. The method of claim 5, wherein the encrypted media content has DRM header data specifying the DRM scheme.

7. The method of claim 1, wherein the wrapped second key is received from the application server in response to a user of the client device launching the encrypted media content.

8. The method of claim 1, further comprising:
receiving a query from the application server for secure data; and
in response to the query, retrieving a device identity of the client device from the secure store and transmitting the device identity to the application server;
wherein the wrapped second key is received in response to transmitting the device identity to the application server.

9. The method of claim 8, wherein the device identity is a unique serial number for the client device.

10. The method of claim 8, further comprising:
receiving a message from the application server specifying a policy corresponding to one or more business rules for access to the encrypted media content by the client device; and
setting the policy in response to the message;
wherein the decrypting is performed in accordance with the one or more business rules.

11. The method of claim 10, further comprising writing data corresponding to the policy to the secure store, in response to the message.

12. The method of claim 10, wherein the policy corresponds to a license for the client device obtained by the application server from a license server.

13. The method of claim 1, wherein:
the second key is a content key; and
the client device is configured to unwrap content keys for a plurality of DRM schemes using the first key.

14. A client device, comprising:
one or more processors; and
memory storing one or more programs configured to be executed by the one or more processors, the one or more programs including instructions for:
storing a first key in a secure store of the client device;
receiving a wrapped second key from an application server;
retrieving the first key from the secure store;
using the first key to unwrap the second key;
receiving encrypted media content from the application server;
receiving, from a player proxy the application server, a media control command to control playback of the received encrypted media content;
decrypting the encrypted media content using the unwrapped second key;
decoding the decrypted media content for playback;
during playback of the decrypted media content, transmitting, to the player proxy at the application server, a play position of the decrypted media content, wherein:
the play position of the decrypted media content is used by the player proxy at the application server to continue providing the encrypted media content, and
the play position is transmitted to the application server repeatedly while playback of the decrypted media content continues; and
transmitting, to a display device that is coupled to the client device, the decrypted media content, wherein the decrypted media content is displayed in accordance with the media control command received from the player proxy.

15. A non-transitory computer-readable storage medium storing one or more programs for execution by one or more processors of a client device, the one or more programs including instructions for:
storing a first key in a secure store of the client device;
receiving a wrapped second key from an application server;
retrieving the first key from the secure store;
using the first key to unwrap the second key;
receiving encrypted media content from the application server;
receiving, from a player proxy the application server, a media control command to control playback of the received encrypted media content;
decrypting the encrypted media content using the unwrapped second key;
decoding the decrypted media content for playback;
during playback of the decrypted media content, transmitting, to the player proxy at the application server, a play position of the decrypted media content, wherein:
the play position of the decrypted media content is used by the player proxy at the application server to continue providing the encrypted media content, and
the play position is transmitted to the application server repeatedly while playback of the decrypted media content continues; and
transmitting, to a display device that is coupled to the client device, the decrypted media content, wherein the decrypted media content is displayed in accordance with the media control command received from the player proxy.

\* \* \* \* \*